(12) United States Patent
Uhlir-Tsang

(10) Patent No.: US 7,052,537 B2
(45) Date of Patent: May 30, 2006

(54) SOLVENT SYSTEMS FOR INK-JET INKS

(75) Inventor: Linda C. Uhlir-Tsang, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 98 days.

(21) Appl. No.: 10/400,131

(22) Filed: Mar. 25, 2003

(65) Prior Publication Data

US 2004/0187739 A1 Sep. 30, 2004

(51) Int. Cl.
*C09D 11/02* (2006.01)
*B41J 2/01* (2006.01)

(52) U.S. Cl. .............. 106/31.49; 106/31.58; 347/100

(58) Field of Classification Search ........... 106/31.49, 106/31.58, 31.47; 347/100
See application file for complete search history.

(56) References Cited

U.S. PATENT DOCUMENTS

| | | | |
|---|---|---|---|
| 5,356,464 A | | 10/1994 | Hickman et al. |
| 5,389,132 A | | 2/1995 | Davulcu et al. |
| 5,626,655 A | * | 5/1997 | Pawlowski et al. ...... 106/31.27 |
| 5,766,327 A | * | 6/1998 | Maze ...................... 106/31.58 |
| 6,019,828 A | * | 2/2000 | Rehman .................. 106/31.58 |
| 6,086,198 A | * | 7/2000 | Shields et al. ............. 347/100 |
| 6,187,086 B1 | * | 2/2001 | Rehman .................. 106/31.86 |
| 6,224,660 B1 | * | 5/2001 | Stubbe et al. ............ 106/31.13 |
| 6,605,337 B1 | * | 8/2003 | Mori et al. ................. 428/206 |
| 2002/0025994 A1 | | 2/2002 | Ishizuka et al. |
| 2003/0079647 A1 | * | 5/2003 | Kaneko et al. .......... 106/31.43 |
| 2004/0155947 A1 | * | 8/2004 | Ozawa et al. ............... 347/100 |

FOREIGN PATENT DOCUMENTS

EP 1029903 8/2000

* cited by examiner

*Primary Examiner*—Helene Klemanski

(57) ABSTRACT

The present invention is drawn to an ink-jet ink, comprising an aqueous ink vehicle including effective amounts 2-methyl-1,3-propanediol and derivatized 2-pyrrolidinone, and a dye solubilized in the ink-vehicle. A method of ink-jetting ink with acceptable decap, recovery, and color attributes is also provided that can comprise jetting an ink-jet ink from an ink-jet pen, wherein the ink-jet ink includes an ink vehicle including effective amounts 2-methyl-1,3-propanediol and derivatized 2-pyrrolidinone, and a dye solubilized in the ink-vehicle.

37 Claims, No Drawings

SOLVENT SYSTEMS FOR INK-JET INKS

FIELD OF THE INVENTION

The present invention relates generally to ink-jet inks having improved decap, recovery, and color attributes. More particularly, a solvent system is provided that works well with dyes.

BACKGROUND OF THE INVENTION

In general, ink-jet inks are either dye- or pigment-based inks. Dye-based ink-jet inks generally use a soluble colorant that is usually water-based to turn the media a specific color. Alternatively, pigmented inks typically use a dispersed colorant to achieve color. In many cases, the line quality and accuracy of plots produced by pigment-based inks can be superior to that of dye-based inks. However, certain challenges exist with pigments because the colorant is present as a dispersion. With pigmented inks, solid particles are jetted with a vehicle and the solid particles adhere to the surface of the substrate. Once the water in the solution has evaporated, the particles will generally not redisperse, thereby producing a dried image.

As dye-based ink-jet inks have typically provided line quality and accuracy of plots that are generally inferior to pigment-based ink-jet inks, there has been increased interest in improving print quality resulting from the use of dye-based ink-jet inks. One problem associated with reduced line quality and accuracy of plots of dye-based ink-jet inks is directly related to a shorter-term problem associated with capping or decap, as well as longer-term problem associated with recovery. To avoid the problems associated with decap, pens are fired periodically at times other than when printing on a desired substrate, resulting in wasted ink-jet ink. The time between two firings is called slewing time. Thus, by increasing slewing time, less ink-jet ink is wasted and the ink-jet printer does not have to work as hard. One method of increasing slewing time that is known in the prior art is to increase the kinetic energy of the drop ejected from the pen. However, increasing the kinetic energy also tends to increase the spray, drop weight, and/or other image quality degrading characteristics. Further, this strategy does not work when a printer is turned off, or is unplugged. Thus, pen clogging related to longer-term recovery is also a problem in the ink-jet arts. As such, it would be desirable to provide ink-jet ink formulations that maintain good image quality when printed with reduced decap resulting from slewing, as well as after longer periods during extended power down. It would also be desirable to provide ink-jet inks that perform well in systems that utilize salts, as well as in systems of a more traditional nature.

SUMMARY OF THE INVENTION

The present invention relates to an ink-jet ink comprising (a) an aqueous ink vehicle including effective amounts 2-methyl-1,3-propanediol and derivatized 2-pyrrolidinone; and (b) a dye solubilized in the ink-vehicle.

Alternatively, the present invention relates to a method of ink-jetting ink with acceptable decap, recovery, and color attributes, comprising jetting an aqueous ink-jet ink from an ink-jet pen, wherein the ink-jet ink includes an ink vehicle comprising effective amounts 2-methyl-1,3-propanediol and derivatized 2-pyrrolidinone, and a dye solubilized in the ink-vehicle.

Additional features and advantages of the invention will be apparent from the detailed description that follows, which illustrates, by way of example, features of the invention.

DETAILED DESCRIPTION OF THE PREFERRED EMBODIMENT(S)

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The singular forms "a," "an," and, "the" include plural referents unless the context clearly dictates otherwise. Thus, for example, reference to "a dye" includes reference to one or more of such dyes.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 wt % to about 5 wt %" should be interpreted to include not only the explicitly recited concentration of about 0.1 wt % to about 5 wt %, but also include individual concentrations and the sub-ranges within the indicated range. Thus, included in this numerical range are individual concentrations such as 1 wt %, 2 wt %, 3 wt %, and 4 wt %, and sub-ranges such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than about 5 wt %" should be interpreted to include all values and sub-ranges between 0 wt % and 5 wt %. Furthermore, such an interpretation should apply regardless of the breadth of the range or the characteristics being described.

As used herein, "effective amount" refers to the minimal amount of a substance or agent, which is sufficient to achieve a desired result. For example, an effective amount of an "ink vehicle" is the minimum amount required in order to create an ink composition, while maintaining properties necessary for effective ink-jetting.

As used herein, "ink vehicle," refers to the liquid vehicle in which a dye is solubilized to form an ink-jet ink. By "solubilized," such a dye does not necessarily have to be completely solubilized. Ink vehicles are well known in the art, and a wide variety of ink vehicles may be used with the ink composition of the present invention. Such ink vehicles include water and a mixture of a variety of different agents, including without limitation, organic solvents, organic co-solvents, buffers, biocides, chelating agents, surface-active agents (surfactants), light stabilizers, and polymers, to name a few examples.

An "ink-jet ink" or "ink composition" comprises an aqueous ink vehicle and a dye.

When referring to saturated or unsaturated, branched or straight-chained aliphatic groups, the term "lower" shall mean from 1 to 6 carbon atoms. When indicated, such as by direct reference or by reference to "combinations thereof," such aliphatic groups can also include other groups attached thereto. An example of such a combination includes hydroxyl lower aliphatic.

With these definitions in mind, an ink-jet ink in accordance with embodiments of the present invention can comprise (a) an aqueous ink vehicle including effective amounts 2-methyl-1,3-propanediol and derivatized 2-pyrrolidinone; and (b) a dye solubilized in the ink-vehicle. In an alternative embodiment, a method of ink-jetting ink with acceptable decap, recovery, and color attributes can comprise jetting an ink-jet ink from an ink-jet pen, wherein the ink-jet ink includes (a) an aqueous ink vehicle including effective amounts 2-methyl-1,3-propanediol and derivatized 2-pyrrolidinone, and (b) a dye solubilized in the ink-vehicle.

In the above embodiments, the term "derivatized 2-pyrrolidinone" specifically excludes unsubstituted pyrrolidinones such as 2-pyrrolidinone. Examples of derivatized 2-pyrrolidinone include molecules wherein one or more hydrogen atoms are replaced with one or more of the following groups: hydroxyl, branched or straight-chain saturated or unsaturated lower aliphatic, halogen, amide, ester, aldehyde, ketone, pyridyl, aryl, and combinations thereof. Formula 1 below depicts possible derivatized 2-pyrrolidinone compositions that can be used in accordance with embodiments of the present invention:

Formula 1

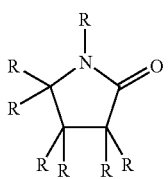

In Formula 1 above, each R can independently be H, hydroxyl, lower straight or branched aliphatic (including saturated and unsaturated lower aliphatic), halogen, amide, ester, aldehyde, ketone, pyridyl, aryl, and combinations thereof, with the proviso that at least one R is other than H. Combinations of such R groups can include, for example, hydroxyl lower aliphatic groups. Typically, most (or even only one) R groups can be H, though this is not required. However, it is desired to not derivatize the 2-pyrrolidinone such that it becomes completely insoluble in water. Thus, in one embodiment, the derivatized 2-pyrrolidinone can be nonionic. In another embodiment, the derivatized 2-pyrrolidinone can be configured such that it is soluble in water when present in water at from 5 wt % or greater. Examples of derivatized 2-pyrrolidinone in accordance with Formula 1 above include the following:

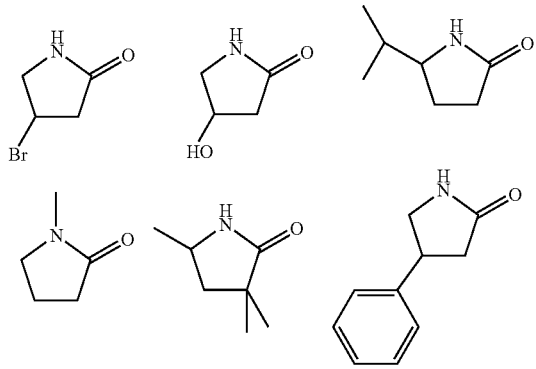

-continued

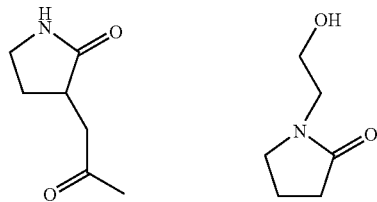

Examples of preferred derivatized 2-pyrrolidinone compositions that can be used include N-methyl-2-pyrrolidinone, 1-(2-hydroxyethyl)-2-pyrrolidinone, 4-hydroxy-2-pyrrolidinone, 5-(hydroxymethyl)-2-pyrrolidinone, 1,5-dimethyl-2-pyrrolidinone, 1-(hydroxymethyl)-2-pyrrolidinone, 3,3,5-trimethyl-2-pyrrolidinone, and 5-methyl-2-pyrrolidinone. In accordance with the composition and method of the present invention, though the presence of derivatized 2-pyrrolidinone is required, the presence of a cosolvent is also present. The cosolvent that is particularly useful for use is 2-methyl-1,3-propanediol. In one embodiment, the 2-methyl-1,3-propanediol and the derivatized 2-pyrrolidinone can be collectively present in the ink-jet ink at from 10 wt % to 40 wt %. In another embodiment, the 2-methyl-1,3-propanediol and the derivatized 2-pyrrolidinone are collectively present in the ink-jet ink at from 15 wt % to 30 wt %. As both are present in the ink-jet ink as co-solvents, in one embodiment, the ratio of 2-methyl-1,3-propanediol to derivatized 2-pyrrolidinone can be from 5:95 to 95:5 by weight.

One advantage of the co-solvent system of the present invention is that it is very compatible for use with salts, which are often used in the ink-jet ink arts. In one embodiment, the ink-jet ink and method of the present invention can include the use of from 0.5 wt % to 15 wt % of an inorganic or organic salt. Examples of such salts that can be used include $Mg^{2+}(NO_3)_2^{2-}$, $Li^+NO_3^-$, $K^+NO_3^-$, $Na^+CH_3SO_3^-$, $Mg^{2+}SO_4^{2-}$, $Na^+NO_3^-$, and/or $Mg^{2+}CH_3SO_4^{2-}$. Though each salt is described alone above, it is understood that each of these specific salt descriptions covers its respective hydrated salt structures as well. For example, $Mg^{2+}(NO_3)_2^{2-}$ would include $Mg^{2+}(NO_3)_2^{2-} \cdot 6H_2O$.

With respect to the dye, almost any ink vehicle-soluble acid dyes, direct dyes, basic dyes, and reactive dyes can be used, which are described in the Color Index. Dyes not described in the Color Index can also be used, provided they are soluble in the ink vehicle. No particular limitation is imposed on the amount of dye used, provided the dye is used in an effective amount as defined herein. However, the dye will typically be present at from 0.1 wt % to 20 wt %.

Additionally, other components that are known in the art can also be used, such as, but not limited to, biocides, metal chelators, and/or buffers. Polymers and light stabilizing agents can also be used in certain embodiments, as is known to those skilled in the art. Typically, one or more of these other components can each be present at from 0 wt % to 3 wt %. Alternatively, such components can be present at from 0.1 wt % to 0.5 wt %. In addition to these additives, a nonionic or anionic surfactant can also be present at from 0 wt % to 10 wt %.

EXAMPLES

The following examples illustrate embodiments of the invention that are presently best known. However, other embodiments can be practiced that are also within the scope of the present invention. All of the ink-jet inks exemplified below had acceptable to excellent color attributes, and each exhibited at least acceptable recovery properties.

Example 1

A magenta ink-jet ink in accordance with principles of the present invention was prepared. The organic solvents used for the ink-jet ink included 17 wt % 2-methyl-1,3-propanediol and 5 wt % N-methyl-2-pyrrolidinone. Additionally, 6 wt % $Mg^{2+}(NO_3)_2^{2-}\cdot 6H_2O$ was added. About 0.75 wt % Acid Red 52 was also added to the ink-jet ink to provide its magenta color. The balance of the ink-jet ink was mostly water, but also contained minor amounts of known additives including 0.2 wt % buffer, 2 wt % nonionic surfactant, and 0.4 wt % anionic surfactant. The ink-jet ink produced was tested for decap properties and was rated excellent.

Example 2

A magenta ink-jet ink in accordance with principles of the present invention was prepared. The organic solvents used for the ink-jet ink included 5 wt % 2-methyl-1,3-propanediol and 17 wt % N-methyl-2-pyrrolidinone. Additionally, 6 wt % $Mg^{2+}(NO_3)_2^{2-}\cdot 6H_2O$ was added. About 0.75 wt % Acid Red 52 was also added to the ink-jet ink to provide its magenta color. The balance of the ink-jet ink was mostly water, but also contained minor amounts of known additives including 0.2 wt % buffer, 2 wt % nonionic surfactant, and 0.4 wt % anionic surfactant. The ink-jet ink produced was tested for decap properties and was rated excellent.

Example 3

A yellow ink-jet ink in accordance with principles of the present invention was prepared. The solvents used for the ink-jet ink included 5 wt % 2-methyl-1,3-propanediol and 17 wt % N-methyl-2-pyrrolidinone. Additionally, 6 wt % $Mg^{2+}(NO_3)_2^{2-}\cdot 6H_2O$ was added. About 3.4 wt % Acid Yellow 23 was also added to the ink-jet ink to provide its yellow color. The balance of the ink-jet ink was mostly water, but also contained minor amounts of known additives including 0.2 wt % buffer, 2 wt % nonionic surfactant, and 0.4 wt % anionic surfactant. The ink-jet ink produced was tested for decap properties and was rated acceptable.

Example 4

A cyan ink-jet ink in accordance with principles of the present invention was prepared. The solvents used for the ink-jet ink included 11 wt % 2-methyl-1,3-propanediol and 11 wt % 1-(2-hydroxyethyl)-2-pyrrolidinone. About 3.1 wt % Direct Blue 199 was also added to the ink-jet ink to provide its cyan color. The balance of the ink-jet ink was mostly water, but also contained minor amounts of known additives including 0.2 wt % buffer, 2 wt % nonionic surfactant, and 0.4 wt % anionic surfactant. The ink-jet ink produced was tested for decap properties and was rated excellent.

Example 5

A magenta ink-jet ink in accordance with principles of the present invention was prepared. The solvents used for the ink-jet ink included 11 wt % 2-methyl-1,3-propanediol and 11 wt % 1-(2-hydroxyethyl)-2-pyrrolidinone. About 0.75 wt % Acid Red 52 was also added to the ink-jet ink to provide its magenta color. The balance of the ink-jet ink was mostly water, but also contained minor amounts of known additives including 0.2 wt % buffer, 2 wt % nonionic surfactant, and 0.4 wt % anionic surfactant. The ink-jet ink produced was tested for decap properties and was rated excellent.

While the invention has been described with reference to certain preferred embodiments, those skilled in the art will appreciate that various modifications, changes, omissions, and substitutions can be made without departing from the spirit of the invention. For example, though specific minor amounts of additives are shown in the Examples, other additives or fewer additives can also be used. It is intended, therefore, that the invention be limited only by the scope of the following claims.

What is claimed is:

1. An ink-jet ink, comprising:
   (a) an aqueous ink vehicle including 2-methyl-1,3-propanediol and derivatized 2-pyrrolidinone, wherein the 2-methyl-1,3-propanediol and the derivatized 2-pyrrolidinone are collectively present in the ink-jet ink at from 10 wt % to 40 wt %;
   (b) a dye solubilized in the ink-vehicle; and
   (c) a salt.

2. An ink-jet ink as in claim 1, wherein the derivatized 2-pyrrolidinone has the following structure:

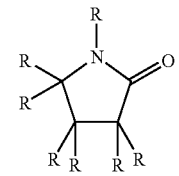

wherein each R group is independently selected from the group consisting of H, hydroxyl, branched saturated lower aliphatic, branched unsaturated lower aliphatic, straight-chain saturated lower aliphatic, straight-chain unsaturated lower aliphatic, halogen, amide, ester, aldehyde, ketone, pyridyl, aryl, and combinations thereof, with the proviso that at least one R is other than H.

3. An ink-jet ink as in claim 2, wherein all but one R group is H.

4. An ink-jet ink as in claim 1, wherein the derivatized 2-pyrrolidinone is nonionic.

5. An ink-jet ink as in claim 1, wherein the derivatized 2-pyrrolidinone is soluble in water when present in water at from 5 wt % or greater.

6. An ink-jet ink as in claim 1, wherein the derivatized 2-pyrrolidinone is selected from the group consisting of N-methyl-2-pyrrolidinone, 1-(2-hydroxyethyl)-2-pyrrolidinone, 4-hydroxy-2-pyrrolidinone, 5-(hydroxymethyl)-2-pyrrolidinone, 1,5-dimethyl-2-pyrrolidinone, 1-(hydroxymethyl)-2-pyrrolidinone, 3,3,5-trimethyl-2-pyrrolidinone, 5-methyl-2-pyrrolidinone, and mixtures hereof.

7. An ink-jet ink as in claim 6, wherein the derivatized 2-pyrrolidinone is 1-(2-hydroxyethyl)-2-pyrrolidinone.

8. An ink-jet ink as in claim 6, wherein the derivatized 2-pyrrolidinone is N-methyl-2-pyrrolidinone.

9. An ink-jet ink as in claim 1, wherein the ratio of 2-methyl-1,3-propanediol to derivatized 2-pyrrolidinone is from 5:95 to 95:5 by weight.

10. An ink-jet ink as in claim 9, wherein the 2-methyl-1,3-propanediol and the derivatized 2-pyrrolidinone are collectively present in the ink-jet ink at from 15 wt % to 30 wt %.

11. An ink-jet ink as in claim 1, wherein the salt is an inorganic or organic salt present at from 0.5 wt % to 15 wt %.

12. An ink-jet ink as in claim 11, wherein the inorganic or organic salt is selected from the group consisting of $Mg^{2+}(NO_3)_2^{2-}$, $Li^+NO_3^-$, $K^+NO_3^-$, $Na^+CH_3SO_3^-$, $Mg^{2+}SO_4^{2-}$, $Na^+NO_3^-$, $Mg^{2+}CH_3SO_4^{2-}$, and mixtures thereof.

13. An ink-jet ink as in claim 1, wherein the dye is present in the ink-jet ink at from 0.1 wt % to 20 wt %.

14. An ink-jet ink as in claim 1, further comprising at least one member selected from the group consisting of biocide, metal chelator, buffer, polymer, and surfactant.

15. A method of ink-jetting ink with acceptable decap, recovery, and color attributes, comprising jetting an aqueous ink-jet ink from an ink-jet pen, said ink-jet ink including:
(a) an ink vehicle including 2-methyl-1,3-propanediol and derivatized 2-pyrrolidinone, wherein the 2-methyl-1,3-propanediol and the derivatized 2-pyrrolidinone are collectively present in the ink-jet ink at from 10 wt % to 40 wt %, and
(b) a dye solubilized in the ink-vehicle, and
(c) a salt.

16. A method as in claim 15, wherein the derivatized 2-pyrrolidinone has the following structure:

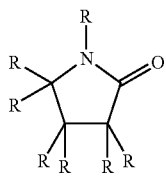

wherein each R group is independently selected from the group consisting of H, hydroxyl, branched saturated lower aliphatic, branched unsaturated lower aliphatic, straight-chain saturated lower aliphatic, straight-chain unsaturated lower aliphatic, halogen, amide, ester, aldehyde, ketone, pyridyl, aryl, and combinations thereof, with the proviso that at least one R is other than H.

17. A method as in claim 15, wherein the derivatized 2-pyrrolidinone is nonionic.

18. A method as in claim 15, wherein the derivatized 2-pyrrolidinone is soluble in water when present in water at from 5 wt % or greater.

19. A method as in claim 15, wherein the derivatized 2-pyrrolidinone is selected from the group consisting of N-methyl-2-pyrrolidinone, 1-(2-hydroxyethyl)-2-pyrrolidinone, 4-hydroxy-2-pyrrolidinone, 5-(hydroxymethyl)-2-pyrrolidinone, 1,5-dimethyl-2-pyrrolidinone, 1-(hydroxymethyl)-2-pyrrolidinone, 3,3,5-trimethyl-2-pyrrolidinone, 5-methyl-2-pyrrolidinone, and mixtures thereof.

20. A method as in claim 19, wherein the derivatized 2-pyrrolidinone is 1-(2-hydroxyethyl)-2-pyrrolidinone.

21. A method as in claim 19, wherein the derivatized 2-pyrrolidinone is N-methyl-2-pyrrolidinone.

22. A method as in claim 15, wherein the ratio of 2-methyl-1,3-propanediol to derivatized 2-pyrrolidinone is from 5:95 to 95:5 by weight.

23. A method as in claim 15, wherein the salt is an inorganic or organic salt present at from 0.5 wt % to 15 wt %.

24. A method as in claim 23, wherein the inorganic or organic salt is selected from the group consisting of $Mg^{2+}(NO_3)_2^{2-}$, $Li^+NO_3^-$, $K^+NO_3^-$, $Na^+CH_3SO_3^-$, $Mg^{2+}SO_4^{2-}$, $Na^+NO_3^-$, $Mg^{2+}CH_3SO_4^{2-}$, and mixtures thereof.

25. A method as in claim 15, wherein the dye is present in the ink-jet ink at from 0.1 wt % to 20 wt %.

26. An ink-jet ink, comprising:
(a) an aqueous ink vehicle including 2-methyl-1,3-propanediol and 1-(2-hydroxyethyl)-2-pyrrolidinone, wherein the 2-methyl-1,3-propanediol and the 1-(2-hydroxyethyl)-2-pyrrolidinone are collectively present in the ink-let ink at from 10 wt % to 40 wt %; and
(b) a dye solubilized in the ink-vehicle.

27. An ink-jet ink as in claim 26, wherein the ratio of 2-methyl-1,3-propanediol to 1-(2-hydroxyethyl)-2-pyrrolidinone is from 5:95 to 95:5 by weight.

28. An ink-jet ink as in claim 27, wherein the 2-methyl-1,3-propanediol and the 1-(2-hydroxyethyl)-2-pyrrolidinone are collectively present in the ink-jet ink at from 15 wt % to 30 wt %.

29. An ink-jet ink as in claim 26, wherein the ink-jet ink further comprises from 0.5 wt % to 15 wt % of an inorganic or organic salt.

30. An ink-jet ink as in claim 29, wherein the inorganic or organic salt is selected from the group consisting of $Mg^{2+}(NO_3)_2^{2-}$, $Li^+NO_3^-$, $K^+NO_3^-$, $Na^+CH_3SO_3^-$, $Mg^{2+}SO_4^{2-}$, $Na^+NO_3^-$, $Mg^{2+}CH_3SO_4^{2-}$, and mixtures thereof.

31. An ink-jet ink as in claim 26, wherein the dye is present in the ink-jet ink at from 0.1 wt % to 20 wt %.

32. An ink-jet ink as in claim 26, further comprising at least one member selected from the group consisting of biocide, metal chelator, buffer, polymer, and surfactant.

33. A method of ink-jetting ink with acceptable decap, recovery, and color attributes, comprising jetting an aqueous ink-jet ink from an ink-jet pen, said ink-jet ink including:
(a) an ink vehicle including effective amounts of 2-methyl-1,3-propanediol and 1-(2-hydroxyethyl)-2-pyrrolidinone, wherein the 2-methyl-1,3-propanediol and the 1-(2-hydroxyethyl)-2-pyrrolidinone are collectively present in the ink-jet ink at from 10 wt % to 40 wt %, and
(b) a dye solubilized in the ink-vehicle.

34. A method as in claim 33, wherein the ratio of 2-methyl-1,3-propanediol to 1-(2-hydroxyethyl)-2-pyrrolidinone is from 5:95 to 95:5 by weight.

35. A method as in claim 33, wherein the ink-jet ink further comprises from 0.5 wt % to 15 wt % of an inorganic or organic salt.

36. A method as in claim 35, wherein the inorganic or organic salt is selected from the group consisting of $Mg^{2+}(NO_3)_2^{2-}$, $Li^+NO_3^-$, $K^+NO_3^-$, $Na^+CH_3SO_3^-$, $Mg^{2+}SO_4^{2-}$, $Na^+NO_3^-$, $Mg^{2+}CH_3SO_4^{2-}$, and mixtures thereof.

37. A method as in claim 33, wherein the dye is present in the ink-jet ink at from 0.1 wt % to 20 wt %.

* * * * *